No. 641,931. Patented Jan. 23, 1900.
J. W. BROWN, Jr.
FRUIT SEEDER.
(Application filed Mar. 10, 1898.)
(No Model.) 3 Sheets—Sheet 2.
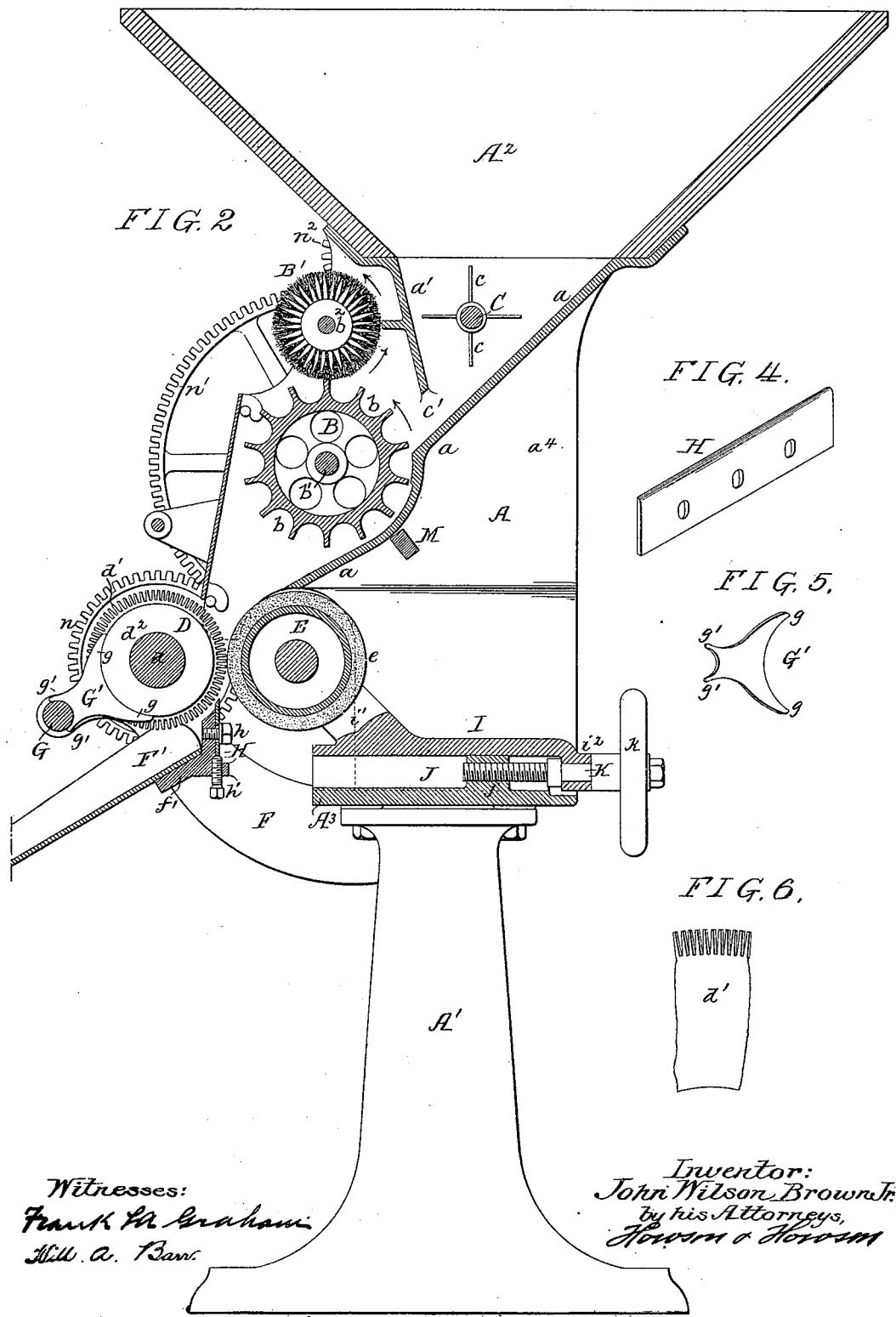
Witnesses:
Frank H. Graham
Will. A. Barr
Inventor:
John Wilson Brown Jr.
by his Attorneys,
Howson & Howson

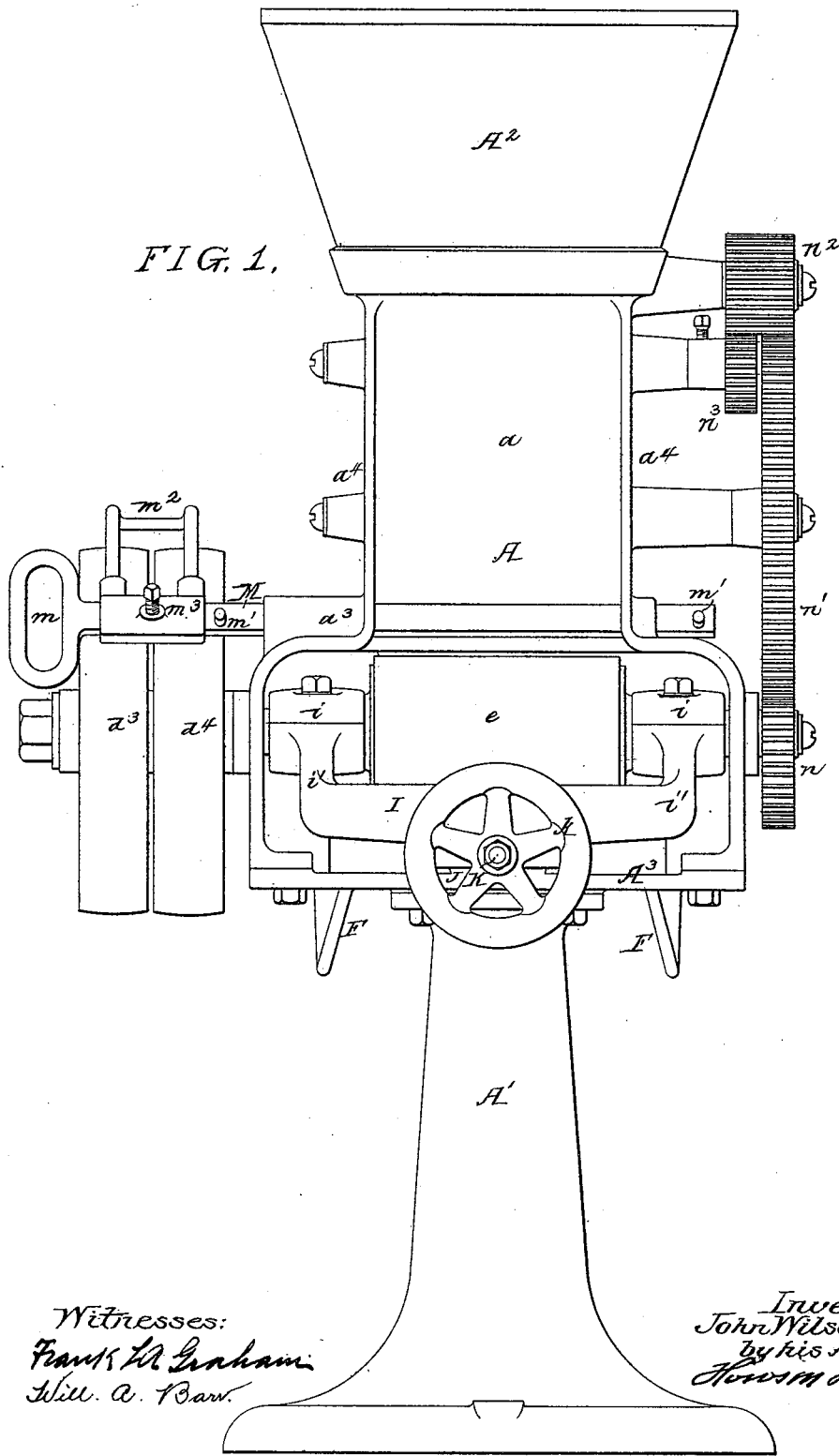

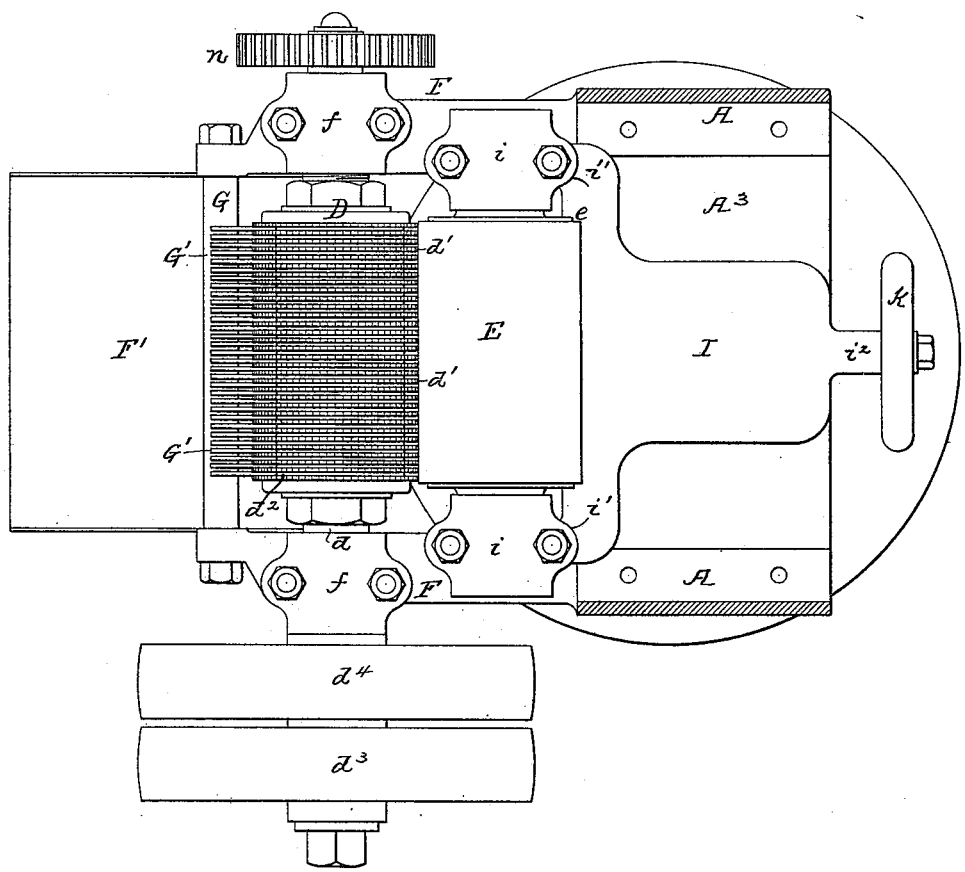

UNITED STATES PATENT OFFICE.

JOHN WILSON BROWN, JR., OF PHILADELPHIA, PENNSYLVANIA.

FRUIT-SEEDER.

SPECIFICATION forming part of Letters Patent No. 641,931, dated January 23, 1900.

Application filed March 10, 1898. Serial No. 673,382. (No model.)

*To all whom it may concern:*

Be it known that I, JOHN WILSON BROWN, Jr., a citizen of the United States, residing in Philadelphia, Pennsylvania, have invented certain Improvements in Fruit-Seeders, of which the following is a specification.

My invention relates to certain improvements in fruit-seeders in which the fruit to be seeded is passed between two rolls, one a pressure-roll and the other having projections, so that the projections force the seeds from the meat of the fruit.

My invention relates to details in the construction of the mechanism for adjusting the rolls and the elements for removing the seeds and the pulp.

My invention is especially adapted for the seeding of raisins, but by adjusting the seeding device other fruits may be seeded as well.

In the accompanying drawings, Figure 1 is a rear view of my improved seeding-machine. Fig. 2 is a sectional elevation. Fig. 3 is a sectional plan view showing the seeding-rolls. Fig. 4 is perspective view of the plate for removing the seeds. Fig. 5 is a perspective view of one of the pulp-removing segments, and Fig. 6 is a perspective view of a portion of one of the toothed disks of the seeding-roll.

A is the frame of the machine, mounted on a pedestal A'. Supported by the frame is a hopper $A^2$, into which the fruit to be seeded is fed. $a$ $a'$ are the walls of the base of the hopper, formed in the frame A, and in this portion of the hopper is an agitating-shaft C, having arms $c$, which tend to separate the fruit.

Mounted on a shaft $b'$ directly in front of the mouth $c'$ of the hopper is a revolving carrier B, having pockets $b$ of a sufficient depth to hold a series of raisins side by side; but these pockets are not deep enough to hold two layers of raisins one upon another. Above the revolving carrier is a brush B', mounted on a shaft $b^2$, which revolves in the direction indicated by the arrows. The brush removes the surplus raisins from the carrier, leaving a single row of raisins in each groove of the carrier. The raisins fall from the carrier into the seeding mechanism, which I will now proceed to describe.

The feeding mechanism described above forms no part of my invention and is covered by a separate application for Letters Patent, filed on December 31, 1897, Serial No. 665,022.

The rolls D and E are the seeding-rolls of the machine. The shaft $d$ of the roll D is adapted to fixed bearings $f$ on brackets F, projecting from the frame of the machine. The roll is composed of a central shaft $d$, having a shoulder at one end and screw-threaded at the opposite end, and a series of disks $d'$, alternating with washers $d^2$, less in diameter than the disks and held against the shoulder by a nut adapted to the screw-thread. The disks $d'$ have notched peripheries forming pins of the shape indicated in Fig. 6, so as to penetrate the raisins, and are so spaced as to prevent the seeds of the raisins entering between the teeth, and the washers are of such a thickness as to prevent the seeds passing between the disks, so that the seeds must necessarily remain on the periphery of the roll. At the rear of the roll is a bar G, secured to the brackets F. Between the disks and the bar are a series of pulp-removing segments G', Fig. 5, having arms $g$ $g$, which partially encircle the washers, and arms $g'$, which partially encircle the bar. These segments alternate with the toothed disks and are for the purpose of removing the meat or pulp of the raisins from the roll after the seeds have been removed. The pulp falls onto an inclined chute F', secured to a cross-bar $f'$ of the brackets F. Secured to the face of this cross-bar $f'$ is a plate H, (shown clearly in Fig. 4,) having a sharp edge which can be adjusted in close proximity to the periphery of the roll D, so as to remove the seeds from the roll. This plate H has a series of slots through which pass confining-screws $h$, and the plate can be adjusted vertically by means of set-screws $h'$, bearing against the under side of the plate, so that by adjusting the set-screws the plate can be moved toward or from the roll, and the plate can be held in the adjusted position by the confining-screws $h$. Access can be had to the adjusting-screws from underneath without removing any portion of the machine.

The roll E has a yielding face $e$, of rubber or other suitable material, and is adapted to bearings $i$, carried by arms $i'$ of a sliding frame I. This frame is adapted to undercut ways J, in the present instance integral with the base-plate $A^3$ of the frame, and the frame I, with its roll, is adjusted toward and from the roll D by means of a screw-shaft K, having a hand-wheel k. This screw-shaft is adapted to a threaded lug j, cast integral in the present instance with the undercut way J, and is confined to a bearing $i^2$ of the slide I, so that on turning this screw-shaft K in one direction the slide and its roll are moved toward the roll D and by reversing the movement of the shaft the roll and its slide are retracted. The screw-shaft locks the slide I in the adjusted position. Thus it will be seen that the roll E can be positively adjusted while the machine is in operation.

In constructing my improved fruit-seeder I preferably make the frame A as indicated in Figs. 1 and 2. The frame has two side plates $a^4$, and extending from one side plate to the other is a cross-plate $a$. This cross-plate extends from the upper portion of the frame diagonally to a point directly above the pressure-roll, forming not only the bottom of the hopper $A^2$, but also forming the chute to direct the fruit to the seeding-rolls. The frame is open at the base, so as to allow for the free movement of the slide I and its roll E. The brackets F are cast integral in the present instance with the base-plate $A^3$, to which the frame A is secured.

The shaft $d$ of the roll D is the driving-shaft of the machine, and on one end of this shaft are the fast and loose pulleys $d^3$ $d^4$. On the opposite end of the shaft is a gear-wheel $n$, which meshes with a wheel $n'$, carried by the shaft $b'$ of the revolving carrier B. This gear-wheel meshes with a broad-faced intermediate wheel $n^2$, adapted to a stud on the frame of the machine, and this wheel in turn engages with a pinion $n^3$ on the shaft $b^2$ of the brush B'. The agitator C is driven by a gear meshing with the intermediate gear-wheel $n^2$.

M is a shifter adapted to bearings $a^3$ in the frame A, and on the end of this shifter is a handhold $m$. The shifter has stops $m'$ to limit its movement, and carried by the shifter is a shifter-arm $m^2$, adjustable on the shifter-bar and secured in the adjusted position by a set-screw $m^3$. This shifter is arranged so as to shift the driving-belt onto either the fast or loose pulley.

While my invention is for the purpose of seeding raisins in large quantities and is illustrated as driven by power, it will be understood that it may be made in small sizes and driven by hand without departing from my invention, and also my invention can be used for seeding other fruits than raisins by simply increasing or diminishing the distance between the teeth of the disks and increasing or diminishing the space between the disks, depending altogether upon the size of the seeds of the fruit to be seeded.

I claim as my invention—

1. The combination in a fruit-seeding machine, of a base-plate, arms projecting from said base-plate, a seeding-roll carried by said arms, a frame A supported on the base-plate and having a diagonal cross-plate forming the bottom of the hopper of the machine, the side plates of the frame extending to and secured to the base-plate and forming an opening under the inclined plate, a slide mounted on the base-plate and having bearings, a pressure-roll carried by said bearings mounted directly under the inclined plate of the frame, and means for adjusting the pressure-roll toward and from the roll adapted to fixed bearings in the machine, substantially as described.

2. The combination in a fruit-seeding machine, of the base, a toothed seeding-roll, a plate secured to said base and carrying arms for supporting the toothed seeding-roll, a frame detachably secured to said plate and carrying the hopper, an adjustable slide adapted to the plate, and a pressure-roll carried by said slide, said frame being extended at both sides to allow for the passage of the bearings for the pressure-roll and entirely open at the rear so as to permit of the ready adjustment or removal of said pressure-roll, substantially as described.

3. The combination in a fruit-seeding machine, of the base, a toothed seeding-roll, a plate secured to said base and carrying arms for supporting the toothed seeding-roll, a frame detachably secured to said plate and carrying the hopper, an adjustable slide adapted to a guide in the plate, and a pressure-roll mounted in bearings carried by arms secured to said slide, said frame being extended at each side so as to accommodate the bearings of the pressure-roll, substantially as described.

4. The combination in a fruit-seeding machine, of the base, a toothed seeding-roll, a plate F secured to said base and carrying arms for supporting said toothed seeding-roll, an adjustable slide adapted to said plate, a pressure-roll carried by arms secured to said slide, and a cross-bar connecting the arms of said plate F, a seed-removing plate carried by said cross-bar, means for adjusting said plate, and a discharge-spout also carried by the cross-bar, substantially as and for the purpose set forth.

In testimony whereof I have signed my name to this specification in the presence of two subscribing witnesses.

JOHN WILSON BROWN, Jr.

Witnesses:
  WILL. A. BARR,
  JOS. H. KLEIN.